United States Patent [19]

Kato

[11] Patent Number: 5,276,992
[45] Date of Patent: Jan. 11, 1994

[54] LURE

[75] Inventor: Seiji Kato, Tokyo, Japan

[73] Assignee: Daiwa Seiko, Inc., Tokyo, Japan

[21] Appl. No.: 905,520

[22] Filed: Jun. 29, 1992

[51] Int. Cl.$^5$ ............................................. A01K 85/00
[52] U.S. Cl. .................................. 43/42.06; 43/42.31; 43/42.35
[58] Field of Search .................. 43/42.06, 42.31, 42.35

[56] References Cited

U.S. PATENT DOCUMENTS

| | | | |
|---|---|---|---|
| 1,609,855 | 12/1926 | Bayer | 43/42.06 |
| 2,229,369 | 1/1941 | Buettner . | |
| 2,317,781 | 4/1943 | Lehto | 43/42.06 |
| 2,589,970 | 3/1952 | Shahan | 43/42.31 |
| 2,613,471 | 10/1952 | Traycik | 43/42.31 |
| 2,878,611 | 3/1959 | Netherton et al. . | |
| 3,541,718 | 11/1970 | Norman | 43/42.35 |
| 3,585,749 | 6/1971 | Dieckmann | 43/42.06 |
| 3,757,455 | 9/1973 | Strader | 43/42.31 |
| 4,098,017 | 7/1978 | Hall | 43/42.06 |
| 4,102,075 | 7/1978 | Wagner et al. . | |
| 4,432,156 | 2/1984 | Gowing | 43/42.35 |
| 4,646,463 | 3/1987 | Koch | 43/42.31 |

FOREIGN PATENT DOCUMENTS 54-145688 10/1979 Japan .
2-42131 11/1990 Japan .

*Primary Examiner*—Kurt C. Rowan
*Attorney, Agent, or Firm*—Longacre & White

[57] ABSTRACT

A lure has an opening part at a front end of a main body. A water resistance part and a connecting part are provided in the opening part. The main body is made from a pair of shell members combined together. Each shell member has a recess part for forming the opening part, an inclined face for forming the water resistance part disposed below the recess part, another recess part for forming a hollow part within the main body, a wall for dividing the opening part and the hollow part and a slotted hole which is provided at a front side of the wall and which communicates with the opening part. The slotted hole is so formed as to be located at the position of a gill in an appearance. Each shell also has the connecting part below the opening part in the main body. Accordingly, it is possible to provide a lure in which the reality of the lure to fish, a living bit or the like is improved without deteriorating an activity or moving ability of the lure.

3 Claims, 1 Drawing Sheet

LURE

BACKGROUND OF THE INVENTION

The present invention relates to a lure employed for fishing.

Conventional lures have been generally formed by imitating fishes and other living things in their shape and color.

A lure disclosed in Japanese Examined Utility Model Publication No. 2-42131 has a shape similar to that of a fish, but its connecting part to which a fishing line is connected, its lip for applying an action to the lure or the like are provided outside the lure. Therefore, the lure fails to have actuality as a fish because of the existence of the connecting part and the lip.

Japanese Unexamined Utility Model Publication No. 54-145688, discloses another lure which has an opening part provided at an end of a main body of lure, and holes provided at both sides thereof, the holes being communicating with the opening part. However, the lure is a smell generating type lure and not one adapted to float and move in water.

U.S. Pat. Nos. 2,229,369, 2,878,611 and 4,102,075 also disclose conventional lures of the type in which the passage of water is provided in a body. However, these conventional lures also fails to have reality as of a fish or living bit.

As mentioned above, even if the conventional lure is manufactured by imitating fishes or other living things, they have no actuality or reality of the fishes, because various members to generate action of a lure are protruded outside the main body of lure. Further, in the conventional lure having the water passage, there is no particular attention to provide the lure with reality in respect of a discharge port, which is an end of the passage.

SUMMARY OF THE INVENTION

An object of the present invention is to solve the above described problems and to provide a lure in which an outer appearance of a main body of lure is made more similarly to the shape of a fish, a living bit or the like, and in which a passage of water is provided without deteriorating the appearance in reality. Another object is to provide a lure in which the reality of the lure to fish, a living bit or the like is improved without deteriorating an activity or moving ability of the lure.

According to the present invention, there is provided a lure having an opening part at a front end of a main body of lure and water discharge holes communicating with the opening part, wherein a connecting part of a fishing line and water resistance parts are provided in the opening part.

With this arrangement, when a fishing line is cast, the lure lands on the water and floats in such an inclined manner that a front end side slightly protrudes from the water surface and a rear end side sinks in the water. When the fishing line is pulled under this state, the head of the lure is directed toward the pulling direction of the fishing line. Thus, the water enters from an open end into an opening part and is discharged outside from slotted holes, so that the water flow similar to the respiration of a fish is produced as if a true fish pours out water from its gills. As a result, many fishes can be effectively allured.

At this time, water entering from the opening part collides with inclined faces which are the resistance parts of water so that the main body of lure floatingly moves so as to swing and sway.

BRIEF DESCRIPTION OF THE DRAWINGS

The present invention will become more apparent from the following description of the preferred embodiment, with reference to the accompanying drawings, in which.

DETAILED DESCRIPTION OF THE PREFERRED EMBODIMENT

Figure 1:
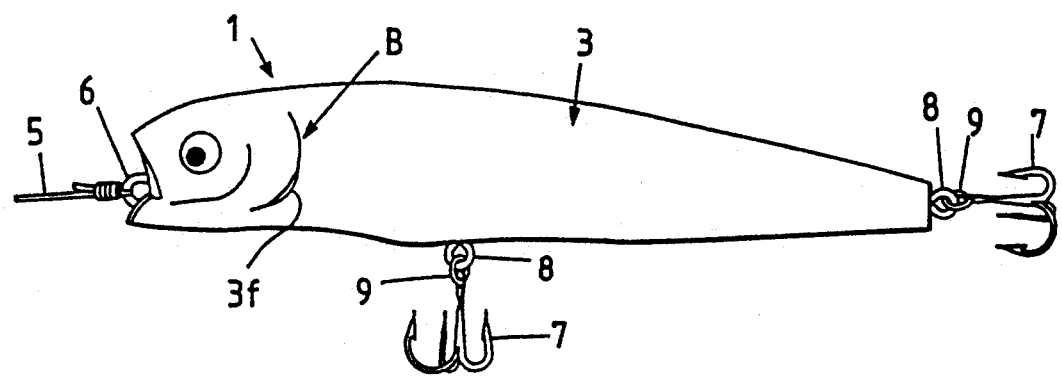
FIG. 1 is a side view of an appearance of a lure.

A fishing lure according to an embodiment of the present invention will now be described in detail with reference to the drawing attached hereto.

In the drawings, a main body 1 of lure is formed by connecting a pair of longitudinally extending right and left shell members 2 and 3 together.

The shell members 2 and 3 are formed of synthetic resin material such as plastic and manufactured by imitating a fish in appearance.

An opening part or water chamber 4 is formed at a front end of the main body 1 of the lure. In the opening part 4, provided is a connecting part 6 to which a fishing line 5 is connected. Attaching parts 8, 8 for fishhooks 7, 7 are provided on the main body of the lure at substantially intermediate and rear positions of the entire length thereof. The fishhooks 7, 7 are attached to the attaching parts 8, 8 through coupling rings 9, 9 so as to be swingingly movable.

The opening part or water chamber 4 is constituted with first recess parts 2a and 3a. A hollow part is constituted with second recess parts 2g and 3g. The opening and hollow parts being formed when the right and left shell members 2 and 3 are combined together.

Figure 2:
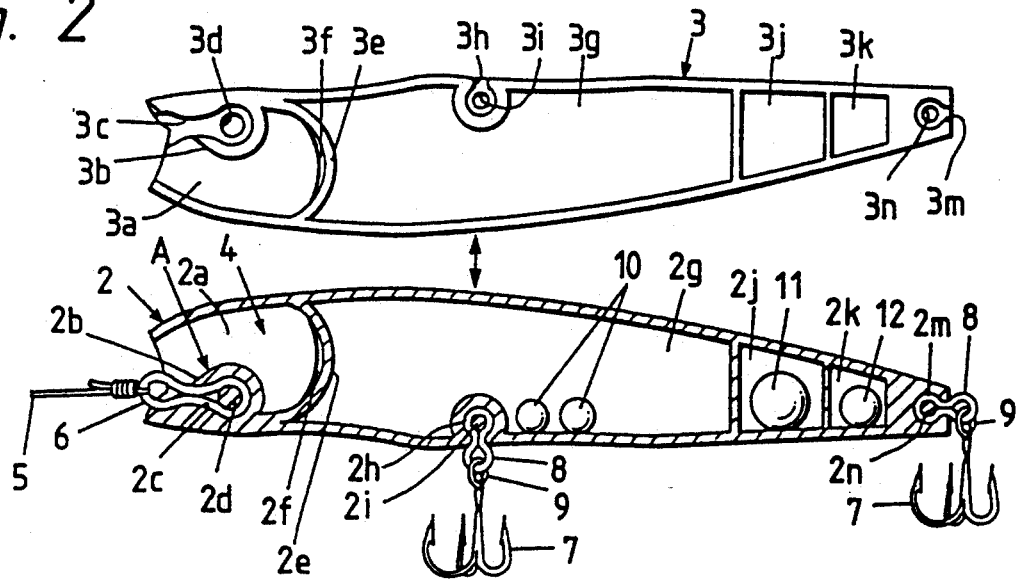
FIG. 2 shows side views in section of one side and the other side of a main body of the lure divided into two.

As shown in FIG. 2, in the shell member 2, there are provided an inclined face 2b as a water resistance part A located below the recess part 2a, a recess part 2c into which the connecting part 6 is fitted, a pin 2d in the recess part 2c for fixing the connecting part 6 thereto, a wall 2e formed at a rear part of the recess part 2a and a slotted hole 2f which is provided at a front side of the wall 2e and which communicates with the opening part 4. The slotted hole 2f is formed so as to be located at the position of a gill B in an appearance shown in FIGS. 1 and 3 and elongated along the gill B.

A hollow part 2g is formed at a rear part of the wall 2e. On a bottom of the hollow part 2g, a recess part 2h are formed, into which one attaching part 8 is fitted. A pin 2i is provided in the recess part 2h for securing the attaching part 8 thereon.

A plurality of weights 10 are movably housed in the hollow part 2g. At the rear part of the hollow part 2g, formed are a plurality of hollow parts 2j and 2k in which weights 11 and 12 are respectively housed.

At the rear part of the shell member 2, there are provided a recess part 2m into which the other attaching part 8 is fitted, and a pin 2n is provided in the recess part 2m for securing the other attaching part 8 thereon.

Figure 3:
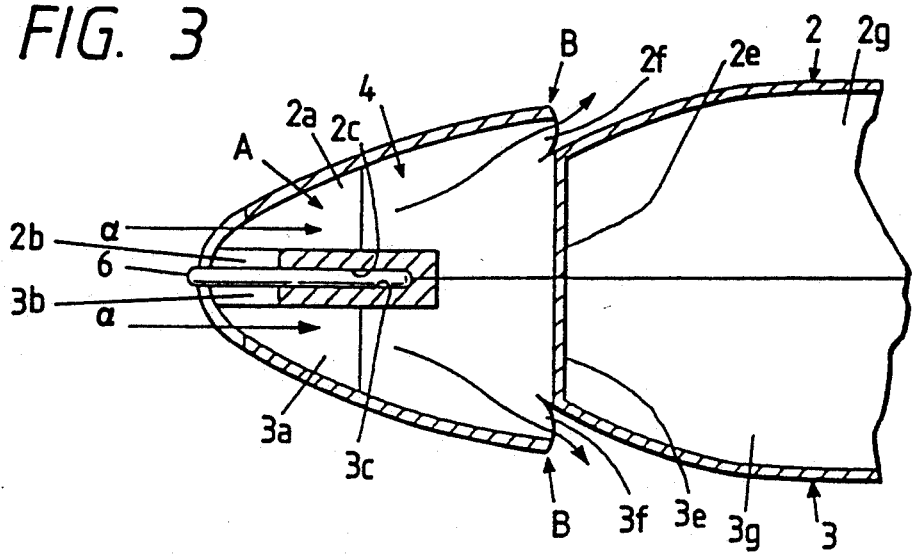
FIG. 3 is an enlarged plan view of a main part of lure.

As shown in FIG. 2, in the shell member 3, there are provided an inclined face 3b as a water resistance part A disposed above the recess part 3a, a recess part 3c into which the connecting part 6 is fitted, a recess part 3d formed in the recess part 3c for fitting the pin 2d of the shell member 2 therein, a wall 3e formed at a rear part of the recess part 3a and a slotted hole 3f which is provided at a front side of the wall 3e and which communicates with the opening part 4. The slotted hole 3f is formed so as to be located at the position of a gill B opposite to the above-described gill B in appearance as shown in FIG. 3 and elongated along the gill B.

A hollow part 3g is formed at a rear part of the wall 3e. On an upper part of the hollow part 3g in FIG. 3, formed are a recess part 3h into which the attaching part 8 is fitted and a recess part 3i formed in the recess part 3h for receiving the pin 2i therein.

At the rear part of the hollow part 3g, formed are a plurality of hollow parts 3j and 3k.

At the rear part of the shell member 3 there are provided a recess part 3m into which the attaching part 8 is fitted and a recess part 3n formed in the recess part 3m for receiving the pin 2n therein.

The pair of right and left shell members 2 and 3 are combined together as described above and formed in an integral structure by fitting the pins 2d, 2i and 2n into the recess parts 3d, 3i and 3n, respectively.

A pattern similar to that of a fish is drawn on the outer surfaces of the pair of right and left shell members 2 and 3.

As can been seen in FIG. 1, an end of the connecting part 6 on which the fishing line 5 is connected, slightly protrudes from the open end of the opening part 4 of the main body 1 as viewed from the side face of the main body 1, in such a degree that the fishing line 5 can be passed through the aperture of the connecting part 6.

The main body 1 of lure is adapted, when it is thrown in the water, to float in the water in the inclined manner with its front end side slightly protruding on the water surface and its rear end side sinking in the water, owing to the balance between the plurality of weights 10, 11 and 12 and the hollow parts 2g, 3g.

Upon use of the lure, when the fishing line is cast, the main body 1 of lure lands on the water and floats in an inclined manner with the front end side slightly protruding on the water surface and the rear end side sinking in the water as mentioned above. When the fishing line is pulled under this state, the head of the lure is directed toward the pulling direction of the fishing line 5. Thus, as shown in FIG. 3, the water enters from the open end into the opening part 4 as indicated by $\alpha$ and is discharged from the slotted holes 2f and 3f which is provided at both sides of the main body 1 and which communicates with the opening part 4. Further, since each end o of gill B is slightly larger in width than a portion of the main body 1 at rear part of the gill B as shown in FIG. 3 so as to direct the slotted holes 2f and 3f rearwardly, the discharged water from the slotted holes 2f and 3f flows along the side faces of the main body 1. Accordingly, the water flow similar to the respiration of a fish is produced as if a true fish poured out water from its gills B. This may enable fishes to be allured. Further, since the slotted holes 2f and 3f are formed so as to be elongated along the gills B and provided symmetrically to each other, the discharged water from the slotted holes 2f and 3f stabilize the main body 1 of the lure when the lure is activated.

At this time, since the water entering from the open end of the opening part 4 collides with the inclined faces 2b and 3b forming a water resistance part A, the main body 1 of lure floatingly moves so as to swing and sway.

With the lure formed as mentioned above, movements of the lure can be generated by the water resistance part A. Further, the outer form of the main body 1 of lure can be fabricated more similarly to a shape imitating a living thing with actuality and without deteriorating the movement of the lure.

In the above description, although the outer form of the lure is equal to that of the fish, the lure is not restricted to the fish. It may resemble other living thighs such as a frog.

In addition, the water resistance part A comprising the inclined faces 2a and 3b may be applied to any one that can give the movement to the lure. Therefore, it is not restricted to one formed with the inclined faces 2b and 3b.

As described above, according to the lure of the present invention, since the connecting part on which the fishing line is connected and the water resistance parts for applying an action to the lure are provided within the opening part, the lure can be floatingly moved as similarly to fish, a living bit, or the like without deteriorating the outer appearance in reality. Further, the lure has an excellent effect in practical use in that the outer form of the main body of lure can be manufactured more similarly to a shape imitating a living thing as a lure with actuality.

The present invention is not confined to the embodiment described above, but may be embodied or practiced in other various ways without departing the spirits or essential of the invention.

What is claimed is:

1. A lure comprising:
    an opening part at a front end of a main body of said lure; and
    gills provided at both side faces of said main body to form water discharge holes communicating with said opening part to discharge water entering into said opening part therefrom along said side faces of said main body;
    wherein said main body of said lure comprises a pair of shell members combined together, each of said shell members includes a first recess part for forming said opening part, an inclined face disposed below the first recess part, a second recess part forming a hollow part, a wall for dividing said opening part and said hollow part, and a slotted discharge hole which is provided at a front side of said wall and which communicates with said opening part.

2. The lure according to claim 1, wherein said gills are protruded from said main body to direct said water discharge holes rearwardly.

3. The lure according to claim 1, wherein said water discharge holes are provided in front of said rear wall.

* * * * *